May 5, 1942.  D. A. LARKIN  2,281,701
BASKET
Filed July 24, 1939  2 Sheets-Sheet 1
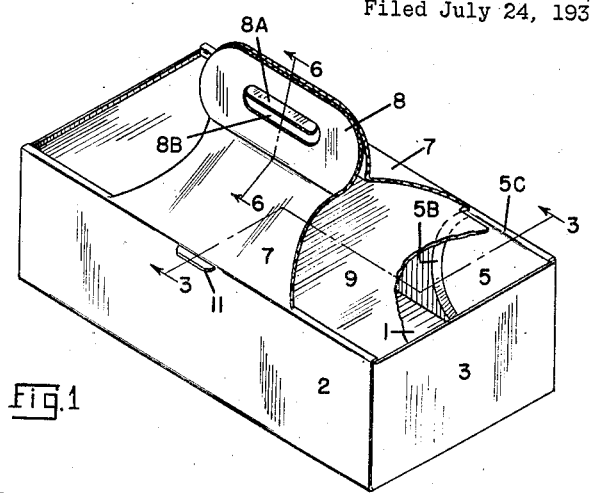
Fig.1
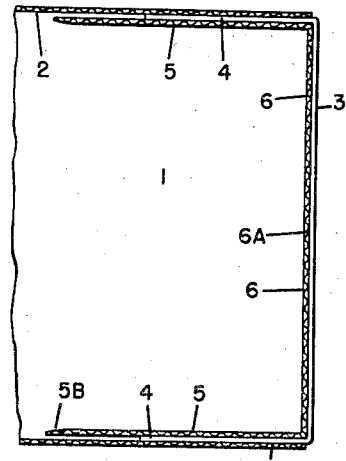
Fig.4
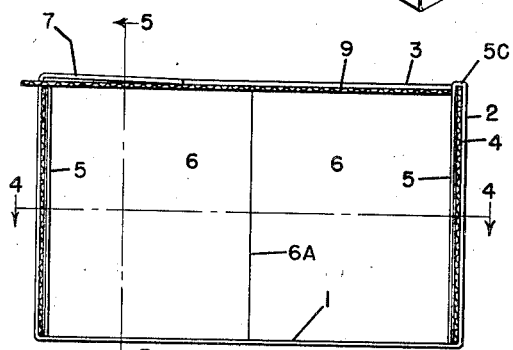
Fig.3
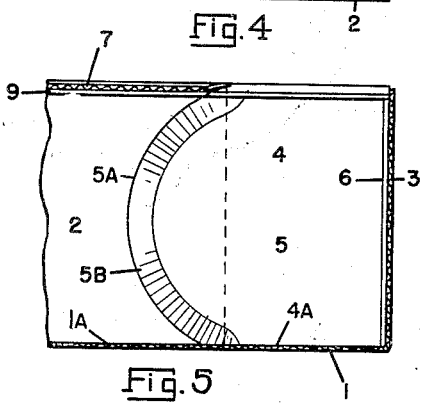
Fig.5
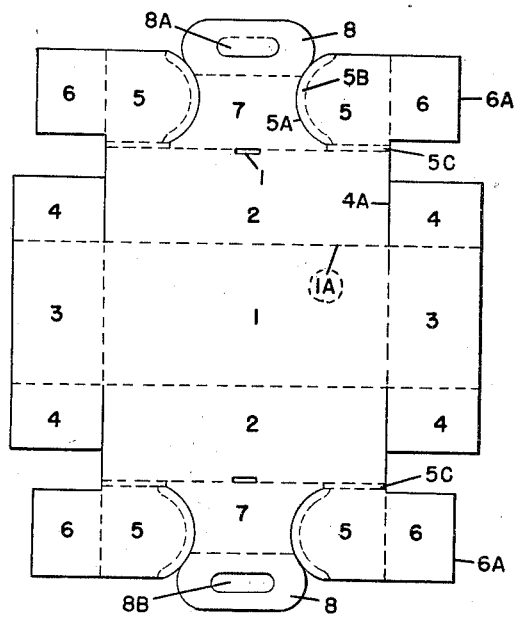
Fig.2
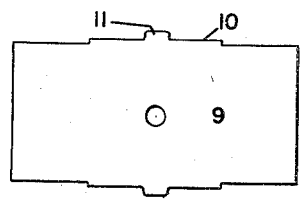
Fig.6
Fig.7
INVENTOR.
DANIEL A. LARKIN
BY Robert W. Wilson
ATTORNEY.

May 5, 1942.  D. A. LARKIN  2,281,701
BASKET
Filed July 24, 1939  2 Sheets-Sheet 2

INVENTOR.
DANIEL A. LARKIN
BY Robert W. Wilson
ATTORNEY.

Patented May 5, 1942

2,281,701

UNITED STATES PATENT OFFICE 2,281,701

BASKET

Daniel A. Larkin, Sandusky, Ohio, assignor to The Hinde & Dauch Paper Company, Sandusky, Ohio, a corporation of Ohio Application July 24, 1939, Serial No. 286,169

1 Claim. (Cl. 229—34)

This invention relates to baskets made of corrugated board material not requiring the use of any fasteners or of any other material such as wire or splint handles. Besides the resulting simplicity of setting up the basket from flat blanks (generally done by unskilled labor in a vegetable packing house or similar establishment), the other advantages of the present invention, which particularly adapt the basket to retail packaging, shipment, storage, and sale of fruits and vegetables, include certain interior arrangements whereby sharp edges which might damage the contents are eliminated, a configuration of parts largely avoiding waste of material in cutting, a handle arrangement which serves both to lock the two parts of the handle together when being carried and also to give a smooth wide and well rounded bearing surface for the hand, which handle arrangement can be folded down entirely flat across the top where several baskets are to be stacked. Other benefits and advantages will appear from the following description of certain preferred practical forms of the invention.

In the accompanying drawings

Fig. 1 is a perspective view of the basket with handles up and with lid applied, partly broken away to show the inside;

Fig. 2 is a plan view of the blank from which the basket is made;

Fig. 3 is a vertical section on the broken plane 3—3 of Fig. 1 but with handle down;

Fig. 4 is a horizontal section of one end on the plane 4—4, Fig. 3, looking downward;

Fig. 5 is an interior elevation of an end of one wall, partly in vertical section, showing an interior detail;

Fig. 6 is a transverse vertical section on plane 6—6 of Fig. 1, showing the handle arrangement;

Fig. 7 is a plan view of the cover;

Figure 8:
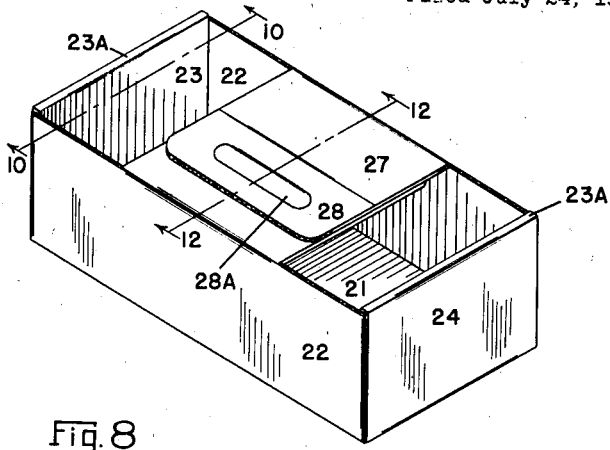
Fig. 8 is a perspective of a modified basket, with handle laid down.
Figure 11:
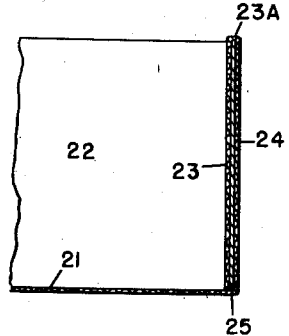
Fig. 11 is a partial longitudinal vertical section on plane 11—11 Fig. 10 showing particularly the end construction.
Figure 10:
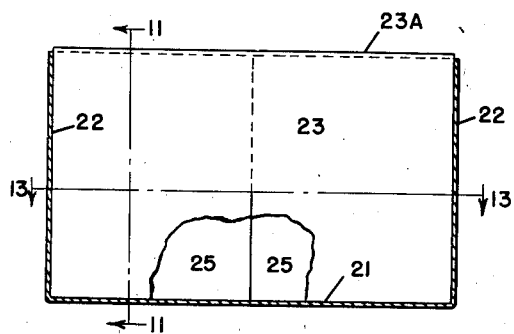
Fig. 10 is a view on the plane 10—10 Fig. 8.

Referring to the blank, Fig. 2, wherein folding creases are represented by dotted lines and full cuts by solid lines, the preferred form of panel comprises a bottom 1, sides 2, ends 3, side tucks 4, inner wall sections 5, end laps 6, handle panels 7 and hand pieces 8. A tongue 8A passing through the hand hole 8B fastens the two hand pieces together and provides a comfortable grip when the basket is carried. The lid 9 is a separate piece. Further details will be explained in connection with the description of setting up the basket.

To set the basket up the sides 2 and ends 3 are turned up perpendicular to the bottom 1 and the ends 3 are similarly turned up, at the same time turning the side tucks 4 at right angles to 3 so that they assume vertical positions against the inner faces of the sides 2, with edge 4A on folding line 1A, as can be seen in Fig. 4. The inner wall sections 5 are then turned down over tucks 4 by hinge bends 5C, and thus lock the ends 3 by the tucks 4. The end laps 6 are bent inward at right angles to the wall sections 5, thus standing against the inner faces of the ends 3, with their edges 6A abutting as best seen in Fig. 4, so that so long as they remain in place these laps 6 hold the sections 5 down as interior walls of the basket.

The shape of the inner edges 5A of the wall sections 5 is most conveniently, although not necessarily, the complementary shape of the handle edges. In the embodiment shown in Fig. 1 these are curved and correspond to a concave curvature of the handle edges, giving an ornamental appearance to the handles. From a functional standpoint it makes no difference whether the handle edges are straight, curved, or of other shape. The sections 5 constitute an extra thickness which does not extend along the entire inner wall of the basket, and thus the inner edges 5A are in contact with the basket contents. To prevent injury to the contents these edges are "feathered" or crushed to a bevel as shown at 5B, so as to avoid presenting a sharp edge to the fruit, tomatoes, or other contents.

A lid 9 may be used, with ends resting on the top edges of the end laps 6, which are cut a little lower than the upper edges of the ends 3 so as to form a step or shelf as seen in Figs. 3 and 5. This lid is widened as at 10 to fill the space at the top of the side walls left by the removal of the handle portions 7 from between the sections 5, and thus snugly close the top. Side tabs 11 engage the top at midlength with slots 12 in the walls 2.

Since the top is slightly sunken below the upper edges of the basket, these baskets can be stacked by laying the handles flat across the top of the lid, Fig. 3.

Figure 9:
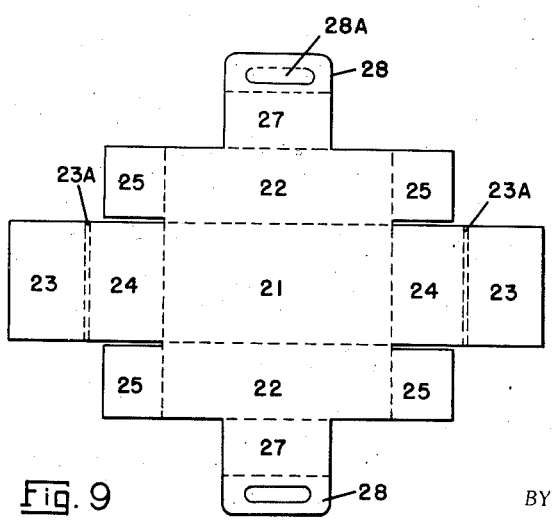
Fig. 9 is a plan view of the blank for the modified basket.
Figure 13:
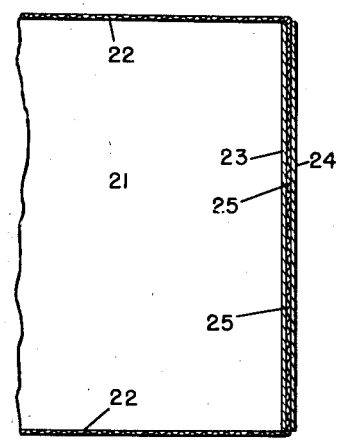
Fig. 13 is a horizontal section looking downwards on plane 13—13 of Fig. 10.

A modified form of basket is illustrated in Figs. 8 to 13 inclusive, comprising bottom 21, sides 22, inner ends 23, outer ends 24, and side locking tabs 25 all bendably interconnected by creases as indicated by the dotted lines in Fig. 9.

In this form the handle sides are shown as straight, although it is clearly apparent that they could be curved or of other ornamental shape if desired. This modification, however, has no inner sides; consequently the handle panels 27, connected directly to the upper edges of the sides 22, extend beyond the general side boundaries of the blank. As in Fig. 1, the handles are completed by hand pieces 28, and a grip tongue 28A may be included.

Figure 12:
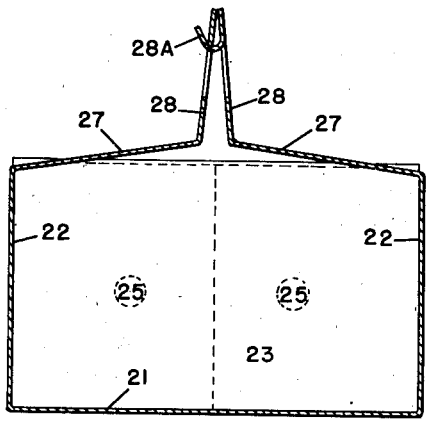
Fig. 12 is a transverse vertical section on plane 12—12 of Fig. 8 but with handle erect.

The end construction here consists of tabs 25 on the sides 22, such tabs 25 being folded across the ends of the assembled basket as seen in Fig. 12, and caught between the inner end walls 23 and outer end walls 24, with their top edges under the hinge joint 23A, thus keeping the basket sides from spreading. The inner ends 23 are cut wide enough to fit snugly between the sides 22 and thus hold in place by friction of their ends.

The handle elements may be laid down as in Fig. 8 for stacking these baskets, or set up for carrying, as in Fig. 12.

From the foregoing it will be seen that I have invented a basket especially adapted to one-piece construction from corrugated board, to shipping in flat condition and setting up easily by untrained help by simple folding operations without stitching, pasting or taping; one in which the ends keep the sides from opening out; one in which the handle is convenient and comfortable to the hand, and can be set down flat across the top of the basket (whether or not a lid is used) and will then not interfere with stacking the set-up baskets.

Having described certain specific forms by way of illustration but not as limitations upon the invention, I claim:

In combination, in a basket having body and handles of fibrous sheet material and slots horizontally disposed at mid-length slightly below the edges of the basket body, a lid adapted to be inset below top level of sides of said body, said lid having integral tabs on its sides fitting into said slots, rabbets on the upper edges of the inner ends of said basket on a level with said slots forming shelves adapted to support the ends of said lid and handles hinged along a limited mid-portion only of the upper edges of said body, said handles being adapted selectively to overlie said lid or to stand up.

DANIEL A. LARKIN.